(12) United States Patent
Chernov et al.

(10) Patent No.: US 9,274,020 B2
(45) Date of Patent: Mar. 1, 2016

(54) SYSTEM AND A METHOD FOR DETECTING LIQUID WATER

(71) Applicant: General Electric Company, Schenectady, NY (US)

(72) Inventors: Gregory Sergeevich Chernov, Louisville, KY (US); Natarajan Venkatakrishnan, Louisville, KY (US); Anthony William Simpson, Goshen, KY (US); Bradford Stewart Gasior, Louisville, KY (US); Kenneth Maurice Jackson, Colorado Springs, CO (US); Daniel Joseph Russell, Colorado Springs, CO (US)

(73) Assignee: General Electric Company, Schenectady, NY (US)

( * ) Notice: Subject to any disclaimer, the term of this patent is extended or adjusted under 35 U.S.C. 154(b) by 110 days.

(21) Appl. No.: 14/052,837

(22) Filed: Oct. 14, 2013

(65) Prior Publication Data

US 2015/0102931 A1    Apr. 16, 2015

(51) Int. Cl.
| | |
|---|---|
| *G08B 21/00* | (2006.01) |
| *G01M 3/16* | (2006.01) |
| *G01M 3/04* | (2006.01) |

(52) U.S. Cl.
CPC ............ *G01M 3/16* (2013.01); *G01M 3/045* (2013.01)

(58) Field of Classification Search
CPC ........ G08C 17/00; G08C 17/02; G08B 23/00; F17D 5/00; F17D 5/02; F17D 5/06; F25D 2700/00; F25D 2700/08; F16L 23/167; F16L 2201/30
See application file for complete search history.

(56) References Cited

U.S. PATENT DOCUMENTS

| | | | |
|---|---|---|---|
| 5,089,144 A | 2/1992 | Ozkahyaoglu et al. |
| 5,190,666 A | 3/1993 | Bisconte |
| 5,192,424 A | 3/1993 | Beyne et al. |
| 5,328,597 A | 7/1994 | Boldt, Jr. et al. |
| 6,009,404 A | 12/1999 | Eimer |
| 6,051,144 A | 4/2000 | Clack et al. |
| 6,303,031 B1 | 10/2001 | Senner |
| 6,355,177 B2 | 3/2002 | Senner et al. |
| 6,533,926 B2 | 3/2003 | Hawkins et al. |
| 6,537,444 B2 | 3/2003 | Wilberscheid et al. |
| 6,551,503 B2 | 4/2003 | Niers et al. |

(Continued)

FOREIGN PATENT DOCUMENTS

| | | |
|---|---|---|
| EP | 1936305 | 6/2008 |
| JP | 2001016025 A | 1/2001 |

(Continued)

OTHER PUBLICATIONS

PCT Search Report and Written Opinion issued in connection with corresponding Application No. PCT/US14/060223 on Jan. 23, 2015.

*Primary Examiner* — Steven Lim
*Assistant Examiner* — Ryan Sherwin
(74) *Attorney, Agent, or Firm* — Dority & Manning, P.A.

(57) ABSTRACT

The present subject matter provides a system and a method for detecting liquid water. The method includes establishing signal communication between an RFID tag and an RFID reader, monitoring the signal communication between the RFID tag and the RFID reader and determining that liquid water is disposed between the RFID tag and the RFID reader or on the RFID tag if the signal communication between the RFID tag and the RFID reader is disrupted, interrupted or terminated.

13 Claims, 4 Drawing Sheets

(56) References Cited

U.S. PATENT DOCUMENTS

| | | | |
|---|---|---|---|
| 6,753,783 B2* | 6/2004 | Friedman et al. | 340/573.7 |
| RE39,361 E | 10/2006 | Den Dekker | |
| 7,481,917 B2 | 1/2009 | Ikeyama et al. | |
| 7,638,042 B2 | 12/2009 | Astle et al. | |
| 7,836,708 B2 | 11/2010 | Krause et al. | |
| 8,118,997 B2 | 2/2012 | Ebrom et al. | |
| 8,196,809 B2* | 6/2012 | Thorstensson | 235/375 |
| 8,216,463 B1* | 7/2012 | Baird | B01D 35/30 210/232 |
| 8,282,820 B2 | 10/2012 | Cur et al. | |
| 8,289,173 B2* | 10/2012 | Ben-Mansour et al. | 340/605 |
| 8,746,003 B2* | 6/2014 | Yoon | B01D 35/153 210/109 |
| 2004/0007516 A1 | 1/2004 | Fritze et al. | |
| 2004/0251210 A1 | 12/2004 | Fritze et al. | |
| 2005/0167352 A1* | 8/2005 | Burrows | B01D 35/153 210/241 |
| 2006/0011523 A1 | 1/2006 | Schrott et al. | |
| 2006/0186031 A1 | 8/2006 | Fick et al. | |
| 2010/0100026 A1* | 4/2010 | Morris | 604/5.04 |
| 2011/0036782 A1 | 2/2011 | Dileo | |
| 2011/0062060 A1 | 3/2011 | Royal et al. | |
| 2012/0297817 A1 | 11/2012 | Krause et al. | |
| 2013/0008838 A1 | 1/2013 | Burke et al. | |
| 2013/0240431 A1* | 9/2013 | Foix | B01D 35/30 210/232 |
| 2014/0110331 A1* | 4/2014 | Baird | B01D 35/153 210/346 |
| 2014/0305930 A1* | 10/2014 | Heizer et al. | 219/539 |
| 2014/0353235 A1* | 12/2014 | Sherman | C02F 1/003 210/236 |

FOREIGN PATENT DOCUMENTS

| | | |
|---|---|---|
| JP | 2007147356 A | 6/2007 |
| JP | 2007163255 A | 6/2007 |
| WO | WO 83/02523 | 7/1983 |
| WO | WO 97/38272 | 10/1997 |
| WO | WO 03/011426 | 2/2003 |
| WO | WO 03/084875 | 10/2003 |
| WO | WO 2004/037383 A1 | 5/2004 |
| WO | WO 2008/125530 | 10/2008 |

* cited by examiner

SYSTEM AND A METHOD FOR DETECTING LIQUID WATER

FIELD OF THE INVENTION

The present subject matter relates generally to RFID systems.

BACKGROUND OF THE INVENTION

Certain water filter assemblies include a manifold and a filter cartridge. The manifold directs unfiltered water into the filter cartridge and filtered water out of the filter cartridge. The filter cartridge includes a filter media, such as an activated carbon block, a pleated polymer sheet, a spun cord material, or a melt blown material. The filter media is positioned within the filter cartridge and filters water passing therethrough.

Over time, the filter media will lose effectiveness. For example, pores of the filter media can become clogged or the filter media can become saturated with contaminants To insure that the filtering media has not exceeded its filtering capacity, the filtering media is preferably replaced or serviced at regular intervals regardless of its current performance. To permit replacement or servicing of the filter media or the filter cartridge, the filter cartridge is generally removably mounted to the manifold.

Water leaks can form or develop at an interface or connection between the filter cartridge and the manifold, such as where the filter cartridge mounts to the manifold. As an example, such leaks can develop if the water filter assembly is installed incorrectly or is exposed to relatively high water pressures or freezing conditions. Such leaks can negatively affect operation of the water filter assembly and/or the refrigerator appliance and can cause damage if not prevented. Such leaks can also be difficult to detect. In particular, water filter assemblies are often positioned in relatively remote locations within refrigerator appliances such that visually monitoring the water filter assemblies for leaks can be difficult or infrequent. Similar problems can make detecting liquid water and water leaks difficult in other circumstances and locations as well.

Accordingly, a system or method for detecting liquid water would be useful. In particular, a system or method for detecting liquid water from water leaks that does not require visual observation and/or that notifies a user of the liquid water would be useful.

BRIEF DESCRIPTION OF THE INVENTION

The present subject matter provides a system and a method for detecting liquid water. The method includes establishing signal communication between an RFID tag and an RFID reader, monitoring the signal communication between the RFID tag and the RFID reader and determining that liquid water is disposed between the RFID tag and the RFID reader or on the RFID tag if the signal communication between the RFID tag and the RFID reader is interrupted or terminated. Additional aspects and advantages of the invention will be set forth in part in the following description, or may be apparent from the description, or may be learned through practice of the invention.

In a first exemplary embodiment, a system for detecting liquid water is provided. The system includes an RFID tag and an RFID reader having a controller. The controller of the RFID tag is configured for establishing signal communication between the RFID tag and the RFID reader, monitoring the signal communication between the RFID tag and the RFID reader, and determining that liquid water is disposed on the RFID tag if the signal communication between the RFID tag and the RFID reader is disrupted during the step of monitoring.

In a second exemplary embodiment, a method for detecting liquid water is provided. The method includes establishing signal communication between an RFID tag and an RFID reader, monitoring the signal communication between the RFID tag and the RFID reader, and determining that liquid water is disposed between the RFID tag and the RFID reader if the signal communication between the RFID tag and the RFID reader is disrupted during the step of monitoring.

In a third exemplary embodiment, a method for detecting liquid water is provided. The method includes receiving a signal from an RFID tag at an RFID reader, monitoring the RFID tag with the RFID reader for an additional signal from the RFID tag, and determining that liquid water is disposed on the RFID tag if the RFID reader does not receive the additional signal from the RFID tag during the step of monitoring.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures.

DETAILED DESCRIPTION

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

Figure 1:
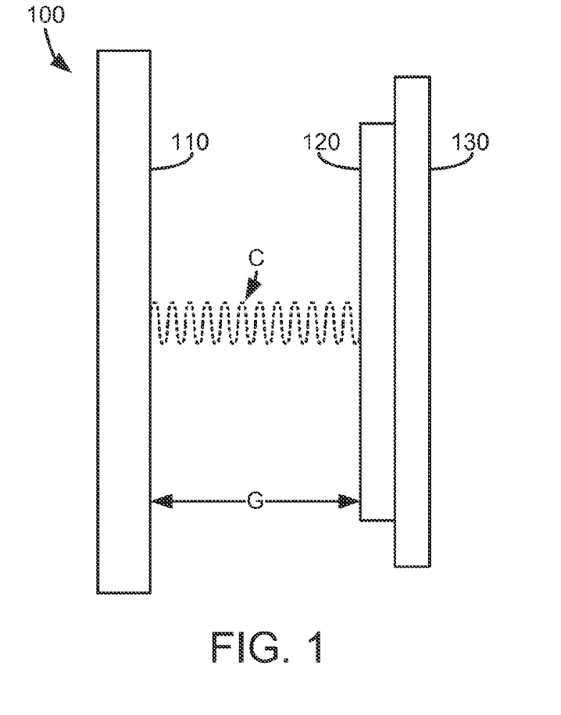
FIG. 1 provides a schematic view of a system for detecting liquid water according to an exemplary embodiment of the present subject matter.

FIG. 1 provides a schematic view of a system 100 for detecting liquid water according to an exemplary embodiment of the present subject matter. As may be seen in FIG. 1, system 100 includes a radio frequency identification reader or RFID reader 110. System 100 also includes a radio frequency identification tag or RFID tag 120. RFID reader 110 is configured for receiving a signal from RFID tag 120. Thus, RFID reader 110 and RFID tag 120 can be in signal communication with each other (shown with wave C in FIG. 1).

RFID reader 110 and RFID tag 120 can have any suitable setup or configuration for placing RFID reader 110 and RFID tag 120 in signal communication C with each other. For example, RFID tag 120 is a passive RFID tag in certain exemplary embodiments. Thus, RFID reader 110 can receive a radio signal from RFID tag 120 in response to a query or request signal from RFID reader 110. In particular, RFID tag 120 can generate or transmit the response radio signal utilizing energy transmitted, e.g., wirelessly, to RFID tag 120 from RFID reader 110 via the query or request signal from RFID reader 110. Thus, RFID tag 120 need not include a battery or other power source in order to generate or transmit the response radio signal. In other exemplary embodiments, RFID tag 120 is an active RFID tag and includes a battery or is connected to a suitable power source. Thus, RFID tag 120 can continuously or intermittently generate or transmit a signal that RFID reader 110 can receive. As will be understood by those skilled in the art, RFID reader 110 and RFID tag 120 can have any other suitable setup or configuration for placing RFID reader 110 and RFID tag 120 in signal communication C with each other. Thus, RFID reader 110 may be passive or active, and RFID tag 120 may be passive or active depending upon the desired setup of system 100.

As will be understood by those skilled in the art, signal communication C between RFID reader 110 and RFID tag 120 is affected by a variety of factors. For example, as may be seen in FIG. 1, RFID reader 110 is positioned proximate or adjacent RFID tag 120. In particular, RFID reader 110 is spaced apart from RFID tag 120, e.g., such that RFID reader 110 and RFID tag 120 define and are spaced apart by a gap G therebetween. Thus, RFID reader 110 and RFID tag 120 are separated by the gap G. Signal communication C between RFID reader 110 and RFID tag 120 can be limited or terminated if the gap G between RFID reader 110 and RFID tag 120 is increased. Thus, in certain exemplary embodiments, RFID reader 110 and RFID tag 120 are fixed such that a position of RFID reader 110 relative to RFID tag 120 and the gap G are substantially constant.

RFID reader 110 and RFID tag 120 can also be tuned such that signal communication C between RFID reader 110 and RFID tag 120 is established with a particular transmission media, such as air, disposed between RFID reader 110 and RFID tag 120, e.g., within the gap G. Thus, signal communication C between RFID reader 110 and RFID tag 120 can be disrupted or terminated if the transmission media changes and another material is positioned between RFID reader 110 and RFID tag 120. For example, if water is positioned between RFID reader 110 and RFID tag 120, e.g., within the gap G, signal communication C between RFID reader 110 and RFID tag 120 can be terminated or disrupted. In particular, liquid water can absorb radio waves and thereby terminate or disrupt signal communication C between RFID reader 110 and RFID tag 120. Liquid water can also affect transmission and reception of radio waves by RFID reader 110 and/or RFID tag 120. As discussed in greater detail below, when signal communication C between RFID reader 110 and RFID tag 120 is disrupted, lost or terminated, it can be inferred that liquid water is disposed between RFID reader 110 and RFID tag 120 (e.g., that liquid water is disposed within the gap G between RFID reader 110 and RFID tag 120).

RFID tag 120 is mounted to or positioned on a water filter 130. Water filter 130 can filter water from a water supply (not shown), such as a municipal water source or a well. Water filter 130 can remove contaminants and other undesirable substances from water passing therethrough. As will be understood by those skilled in the art and as used herein, the term "water" includes purified water and solutions or mixtures containing water and, e.g., elements (such as calcium, chlorine, and fluorine), salts, bacteria, nitrates, organics, and other chemical compounds or substances.

As discussed above, water filter 130 can filter a flow of water therethrough. Such filtering can improve taste and/or safety of water. Water filter 130 can include any suitable mechanism for filtering water within water filter 130. For example, a filtering media with water filter 130 may include an activated carbon block, a reverse osmosis membrane, a pleated polymer or cellulose sheet, or a melt blown or spun cord media.

Water filter 130 can be exposed to a variety of conditions that can negatively affect performance of water filter 130. For example, exposing water filter 130 to high water pressure or freezing conditions can negatively affect performance of water filter 130. In particular, such conditions can cause water filter 130 to leak liquid water. System 100 includes features for detecting liquid water and/or determining when liquid water is leaking from water filter 130. For example, leaking liquid water can flow between RFID reader 110 and RFID tag 120 such that signal communication C between RFID reader 110 and RFID tag 120 is interrupted. Thus, when signal communication C between RFID reader 110 and RFID tag 120 is interrupted, it can be inferred that water filter 130 is leaking.

It should be understood that system 100 can be used to detect liquid water and/or water leaks in any other suitable setup or arrangement. Thus, RFID tag 120 need not be mounted to water filter 130 in alternative exemplary embodiments. For example, RFID tag 120 may be mounted to any other suitable container, vessel, pipe, conduit, surface, etc. In such a manner, system 100 may be used to detect water leaks from the container, vessel, pipe or conduit or to detect liquid water in the container, vessel, pipe or conduit or on the surface.

Figure 2:
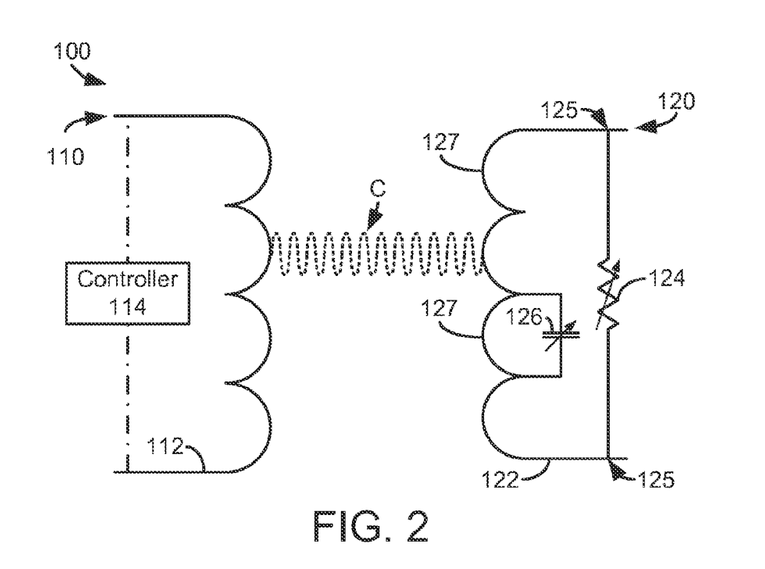
FIG. 2 provides a schematic view of certain components of the exemplary system of FIG. 1.

FIG. 2 provides a schematic view of certain components of system 100. As may be seen in FIG. 2, RFID reader 110 includes an antenna 112. Similarly, RFID tag 120 includes an antenna 122. Radio signals between RFID reader 110 and RFID tag 120 can be generated and received at antenna 112 of RFID reader 110 and antenna 122 of RFID tag 120. Antenna 112 of RFID reader 110 and antenna 122 of RFID can be oriented relative to each other such that signal communication C between RFID reader 110 and RFID tag 120 is facilitated. For example, antenna 112 of RFID reader 110 and antenna 122 of RFID can face each other across the gap G. If the orientation between antenna 112 of RFID reader 110 and antenna 122 of RFID tag 120 is adjusted or changed, signal communication C between RFID reader 110 and RFID tag 120 can be limited or terminated. Thus, as discussed above, RFID reader 110 and RFID tag 120 can be fixed such that the orientation between antenna 112 of RFID reader 110 and antenna 122 of RFID tag 120 is substantially constant or fixed.

As may be seen in FIG. 2, RFID tag 120 includes a water sensitive resistor 124. Water sensitive resistor 124 is electrically coupled to antenna 122 of RFID tag 120. For example, water sensitive resistor 124 may extend between or across terminals 125 of antenna 122 of RFID tag 120. Water sensitive resistor 124 is configured for changing a resistance of water sensitive resistor 124 when water sensitive resistor 124 is exposed to liquid water. As an example, the resistance of water sensitive resistor 124 can increase or decrease when water sensitive resistor 124 is exposed to liquid water. Because water sensitive resistor 124 is electrically coupled to antenna 122 of RFID tag 120, such change in the resistance of water sensitive resistor 124 can disrupt or terminate the signal communication C between RFID reader 110 and RFID tag 120, e.g., by adjusting the electrical characteristics of antenna 122 of RFID tag 120, such as a resonant frequency, and the signal emitted by antenna 122 of RFID tag 120. In certain exemplary embodiments, RFID tag 120 is deactivated or disabled when water sensitive resistor 124 is exposed to liquid water.

RFID tag 120 also includes a water sensitive capacitor 126. Water sensitive capacitor 126 is electrically coupled to antenna 122 of RFID tag 120. For example, water sensitive capacitor 126 may extend between or across coils 127 of antenna 122 of RFID tag 120. Water sensitive capacitor 126 is configured for changing a capacitance of water sensitive capacitor 126 when water sensitive capacitor 126 is exposed to liquid water. As an example, the capacitance of water sensitive capacitor 126 can increase or decrease when water sensitive capacitor 126 is exposed to liquid water. Because water sensitive capacitor 126 is electrically coupled to antenna 122 of RFID tag 120, such change in the capacitance of water sensitive capacitor 126 can disrupt or terminate the signal communication C between RFID reader 110 and RFID tag 120, e.g., by adjusting the electrical characteristics of antenna 122 of RFID tag 120, such as a resonant frequency, and the signal emitted by antenna 122 of RFID tag 120. In certain exemplary embodiments, RFID tag 120 is deactivated or disabled when water sensitive capacitor 126 is exposed to liquid water.

As will be understood by those skilled in the art, the signal communication C between RFID reader 110 and RFID tag 120 can be at a resonant frequency of RFID tag 120, e.g., in order to power RFID tag 120 with RFID reader 110. The resonant frequency of RFID tag 120 can be proportional to an inductance and a capacitance of antenna 122 of RFID tag 120. In particular, the resonant frequency of RFID tag 120 can be determined with the following formula, $$f = \frac{1}{2\pi\sqrt{C*L}}$$

where C is the capacitance of antenna 122 of RFID tag 120, and

L is the inductance of antenna 122 of RFID tag 120.

Thus, when the capacitance of water sensitive capacitor 126 changes, e.g., due to water sensitive capacitor 126 being exposed to liquid water, the resonant frequency of RFID tag 120 can change as well, and the signal communication C between RFID reader 110 and RFID tag 120 can be disrupted due to the change in the resonant frequency of RFID tag 120. For example, the change in the resonant frequency of RFID tag 120 can reduce coupling between RFID reader 110 and RFID tag 120 such that the signal from RFID reader 110 to RFID tag 120 can no longer power RFID tag 120.

It should be understood that in alternative exemplary embodiments, RFID tag 120 need not include both water sensitive resistor 124 and water sensitive capacitor 126. Thus, RFID tag 120 may include water sensitive resistor 124 and not water sensitive capacitor 126 in certain exemplary embodiments. Conversely, in other exemplary embodiments, RFID tag 120 may include water sensitive capacitor 126 and not water sensitive resistor 124.

As may be seen in FIG. 2, RFID reader 110 includes a controller 114. Controller 114 is operatively associated with antenna 112 of RFID reader 110. Controller 114 may include a memory and one or more microprocessors, CPUs or the like, such as general or special purpose microprocessors operable to execute programming instructions or micro-control code associated with operation of system 100 and RFID reader 110. The memory may represent random access memory such as DRAM, or read only memory such as ROM or FLASH. In one embodiment, the processor executes programming instructions stored in memory. The memory may be a separate component from the processor or may be included onboard within the processor. Alternatively, controller 114 may be constructed without using a microprocessor, e.g., using a combination of discrete analog and/or digital logic circuitry (such as switches, amplifiers, integrators, comparators, flip-flops, AND gates, and the like) to perform control functionality instead of relying upon software.

Controller 114 is configured for establishing signal communication C between RFID tag 120 and RFID reader 110. For example, controller 114 can activate RFID reader 110 such that RFID reader 110 queries RFID tag 120 by sending a request signal to RFID tag 120. In response to the request signal, RFID tag 120 can generate or transmit a response signal that is received at RFID reader 110. In such a manner, controller 114 can establish signal communication C between RFID reader 110 and RFID tag 120.

Controller 114 is also configured for monitoring the signal communication C between RFID tag 120 and RFID reader 110. For example, controller 114 can continuously or intermittently operate RFID reader 110 such that RFID reader 110 queries RFID tag 120 by sending a request signal to RFID tag 120. If RFID tag 120 receives the request signal from RFID reader 110, RFID tag 120 can generate or transmit a response signal that is received at RFID reader 110 in response to the request signal. If RFID reader 110 receives the response signal from RFID tag 120, controller 114 can determine that RFID reader 110 and RFID tag 120 are in signal communication C with each other. Conversely, if RFID reader 110 does not receive the response signal from RFID tag 120, controller 114 can determine that RFID reader 110 and RFID tag 120 are not in signal communication C with each other. In such a manner, controller 114 can monitor the signal communication C between RFID tag 120 and RFID reader 110.

If signal communication C between RFID reader 110 and RFID tag 120 is disrupted or terminated, it can be inferred that liquid water is disposed between RFID reader 110 and RFID tag 120, e.g., within the gap G, or on RFID tag 120. A flow of water to water filter 130 can be terminated the signal communication C between RFID tag 120 and RFID reader 110 is lost or disrupted. Thus, controller 114 can, e.g., continuously or intermittently, monitor the signal communication C between RFID tag 120 and RFID reader 110, and the flow of water to water filter 130 can be terminated if the signal communication C is lost or disrupted.

In addition, visual or audio feedback can be provided to a user of system 100 if the signal communication C between RFID reader 110 and RFID tag 120 is disrupted, lost or terminated. As an example, a light emitting device may flash when signal communication C between RFID tag 120 and RFID reader 110 is lost or disrupted. As another example, a sound generator may emit sound when signal communication C between RFID tag 120 and RFID reader 110 is lost or disrupted. In such a manner, the user of system 100 can be alerted if system 100 detects liquid water and/or leaking water.

Figure 3:
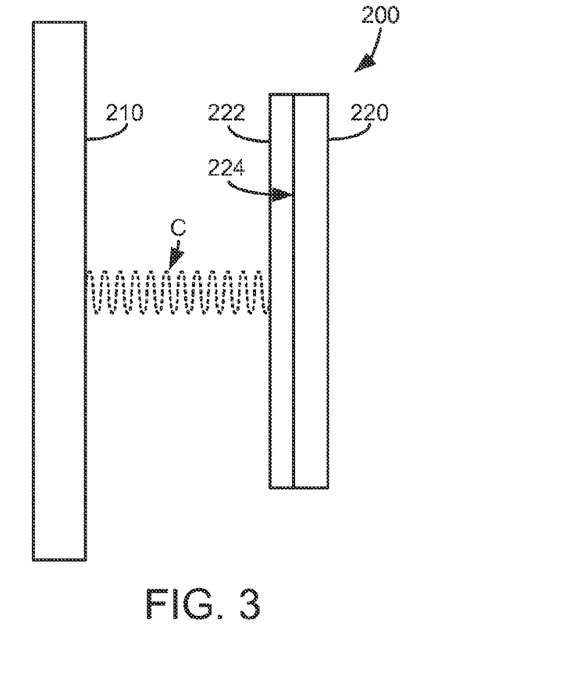
FIG. 3 provides a schematic view of a system for detecting liquid water according to another exemplary embodiment of the present subject matter.

FIG. 3 provides a schematic view of a system 200 for detecting liquid water according to another exemplary embodiment of the present subject matter. System 200 is similar system 100 (FIGS. 1 and 2) and can include similar components and operate in a similar manner. As may be seen in FIG. 3, system 200 includes an RFID reader 210 and an RFID tag 220. RFID tag 220 includes an absorbent material or medium 222 mounted to or disposed on RFID tag 220, e.g., at outer surface 224 of RFID tag 220. As an example, absorbent medium 222 may be positioned on an antenna of RFID tag 220 such that absorbent medium 222 extends across or between coils or terminals of RFID tag 220.

Absorbent material 222 can be any suitable absorbent material. For example, absorbent material 222 may be a sponge, paper, etc. An electrolyte is disposed within absorbent medium 222, e.g., such that absorbent material 222 is doped with the electrolyte. Any suitable electrolyte can be disposed within absorbent medium 222. For example, the electrolyte may be sodium chloride or another salt. Thus, absorbent medium 222 may be any material which is able to hold dry electrolyte and, when saturated with or exposed to water, deliver an electrolyte solution to antenna of RFID tag 220.

As discussed above, the resonant frequency of RFID tag 220 can be proportional to an inductance and a capacitance of the antenna of RFID tag 220. Thus, when absorbent material 222 is dry, e.g., such that the electrolyte within absorbent material 222 is not dissolved, the capacitance of the antenna of RFID tag 220 is a first capacitance value. The first capacitance value can be selected such that the signal communication C between RFID reader 210 and RFID tag 220 is facilitated or enabled. Conversely, the electrolyte within absorbent medium 222 dissolves and ionizes when absorbent medium 222 is exposed to and absorbs liquid water. Without wishing to be bound to any particular theory, when absorbent medium 222 absorbs liquid water and the electrolyte within absorbent medium 222 ionizes, a conductivity of absorbent medium 222 increases. In such a manner, signal communication C between RFID reader 210 and RFID tag 220 can be disrupted or terminated. For example, absorbent medium 222 of RFID tag 222 can short out the antenna of RFID tag 220. As another example, a resistance of absorbent medium 222 can decrease thereby putting a load on the antenna of RFID tag 220. As the resistance drops, the load can increase until the load drains sufficient power from RFID tag 220 such that RFID tag 220 is disabled or deactivated and signal communication C between RFID reader 210 and RFID tag 220 is disrupted or terminated. Further, when absorbent material 222 is wet, e.g., such that the electrolyte within absorbent material 222 is dissolved, the capacitance of the antenna of RFID tag 220 is a second capacitance value. The second capacitance value can be selected such that the signal communication C between RFID reader 210 and RFID tag 220 is disrupted or terminated due to the associated change in the resonant frequency of RFID tag 220.

Figure 4:
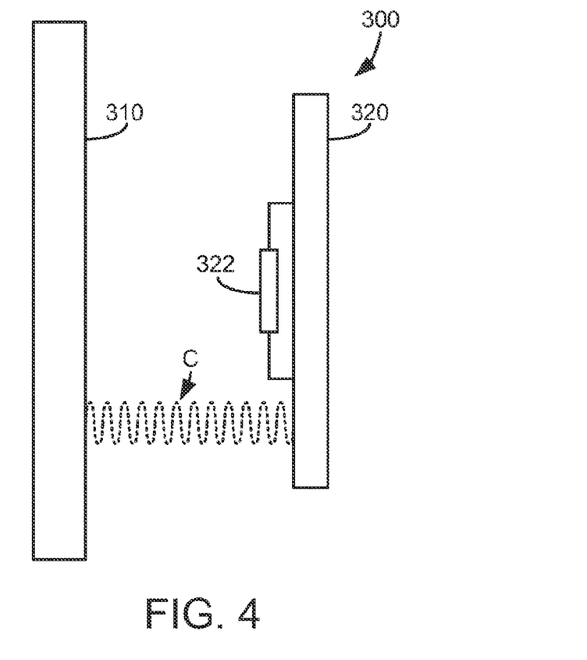
FIG. 4 provides a schematic view of a system for detecting liquid water according to an additional exemplary embodiment of the present subject matter.

FIG. 4 provides a schematic view of a system 300 for detecting liquid water according to an additional exemplary embodiment of the present subject matter. System 300 is similar system 100 (FIGS. 1 and 2) and can include similar components and operate in a similar manner. As may be seen in FIG. 4, system 300 includes an RFID reader 310 and an RFID tag 320. RFID tag 320 includes a humistor 322 mounted to or disposed on RFID tag 320. As an example, humistor 322 may be positioned on an antenna of RFID tag 320 such that humistor 322 extends across or between coils or terminals of RFID tag 320.

Humistor 322 can be any suitable humistor. For example, humistor 322 may be a resistive humistor such that a resistance of humistor 322 changes (e.g., increases or decreases) when humistor 322 is exposed to or contacts liquid water. As another example, humistor 322 may be a capacitive humistor such that a capacitance of humistor 322 changes e.g., increases or decreases) when humistor 322 is exposed to or contacts liquid water. Thus, when humistor 322 is exposed to or contacts liquid water, electrical characteristics of humistor 322 and RFID tag 320 change. Without wishing to be bound to any particular theory, a resistance of humistor 322 can decrease when humistor 322 is exposed to or contacts liquid water thereby putting a load on the antenna of RFID tag 320. As the resistance drops, the load can increase until the load drains sufficient power from RFID tag 320 such that RFID tag 320 is disabled or deactivated and signal communication C between RFID reader 310 and RFID tag 320 is disrupted or terminated.

Figure 5:
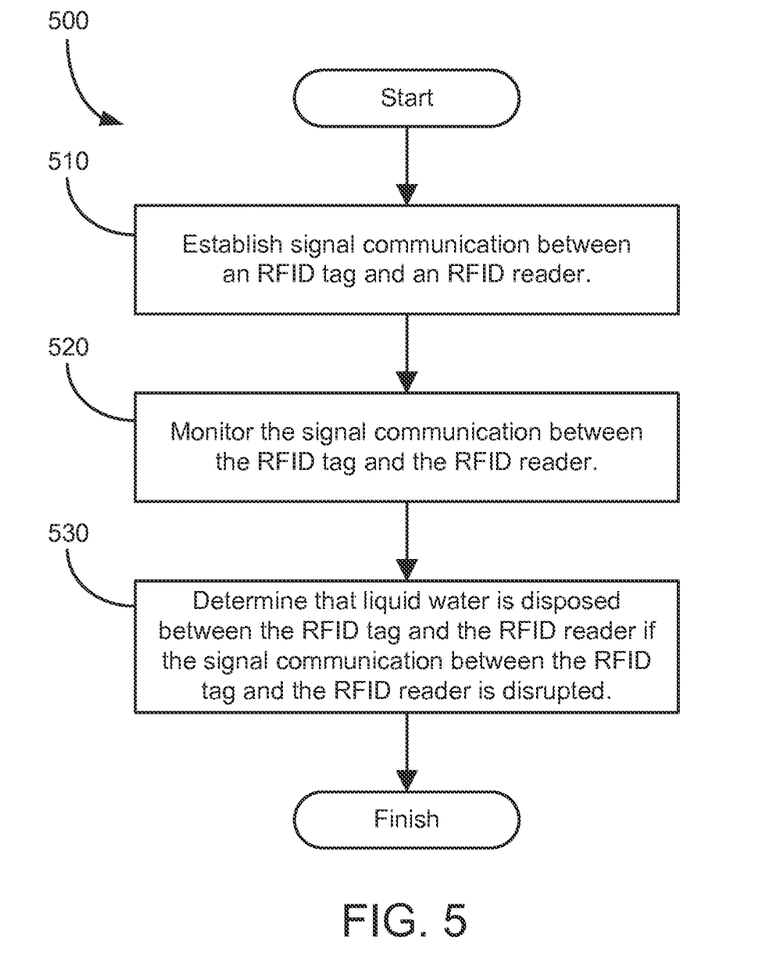
FIG. 5 illustrates a method for detecting liquid water according to an exemplary embodiment of the present subject matter.

FIG. 5 illustrates a method 500 for detecting liquid water according to an exemplary embodiment of the present subject matter. Method 500 can be used to detecting liquid water in any suitable system. For example, method 500 may be used to detecting liquid water in system 100 (FIGS. 1 and 2), system 200 (FIG. 3) and/or system 300 (FIG. 4). In particular, controller 114 of RFID reader 110 may be configured for implementing method 500.

At step 510, signal communication C between RFID tag 120 and RFID reader 110 is established. As an example, controller 114 can establish signal communication C between RFID tag 120 and RFID reader 110 at step 510. In particular, controller 114 can activate RFID reader 110 such that RFID reader 110 queries RFID tag 120 by sending a request signal to RFID tag 120. In response to the request signal, RFID tag 120 can generate or transmit a response signal that is received at RFID reader 110. In such a manner, controller 114 can establish signal communication C between RFID reader 110 and RFID tag 120.

At step 520, the signal communication C between RFID tag 120 and RFID reader 110 is monitored. As an example, controller 114 can monitor the signal communication C between RFID tag 120 and RFID reader 110 at step 520. In particular, controller 114 can continuously or intermittently operate RFID reader 110 such that RFID reader 110 queries RFID tag 120 by sending a request signal to RFID tag 120. If RFID tag 120 receives the request signal from RFID reader 110, RFID tag 120 can generate or transmit a response signal that is received at RFID reader 110 in response to the request signal. If RFID reader 110 receives the response signal from RFID tag 120, controller 114 can determine that RFID reader 110 and RFID tag 120 are in signal communication C with each other. Conversely, if RFID reader 110 does not receive the response signal from RFID tag 120, controller 114 can determine that RFID reader 110 and RFID tag 120 are not in signal communication C with each other. In such a manner, controller 114 can monitor the signal communication C between RFID tag 120 and RFID reader 110.

It should be understood that signal communication C between RFID tag 120 and RFID reader 110 can be disrupted in a variety of manners, e.g., at steps 520 and/or 530 of method 500. For example, signal communication C between RFID tag 120 and RFID reader 110 can be disrupted such that signal communication C between RFID tag 120 and RFID reader 110 is lost or terminated and there is not signal communication C between RFID tag 120 and RFID reader 110.

As another example, signal communication between RFID tag 120 and RFID reader 110 can be disrupted such that signal communication C between RFID tag 120 and RFID reader 110 is, e.g., significantly or substantially, reduced and signal communication C between RFID tag 120 and RFID reader 110 is weakened. In particular, a field strength of signal communication C between RFID tag 120 and RFID reader 110 can be measured and changes in the field strength can be observed over a period of time in order to determine that signal communication C between RFID tag 120 and RFID reader 110 is disrupted, e.g., due to the presence of liquid water between RFID tag 120 and RFID reader 110 or on RFID tag 120.

At step 530, a presence of liquid water is determined or established, e.g., if the signal communication C between RFID tag 120 and RFID reader 110 is disrupted, lost or terminated at or during step 520. As an example, controller 114 can determine that liquid water is disposed or present between RFID reader 110 and RFID tag 120, e.g., within gap G or on RFID tag 120, at step 530. As discussed above, liquid water between RFID reader 110 and RFID tag 120 can absorb radio waves and disrupt signal communication C between RFID reader 110 and RFID tag 120. Further, the electrical characteristics of antenna 122 of RFID tag 120 can be changed (e.g., the capacitance of water sensitive capacitor 126 or the resistance of water sensitive resistor 124), such that antenna 122 of RFID tag 120 is deactivated or disabled when RFID tag 120 is exposed to liquid water. In such a manner, signal communication C between RFID reader 110 and RFID tag 120 can be disrupted or terminated due to the presence of liquid water between RFID reader 110 and RFID tag 120 or on RFID tag 120.

Method 500 can include various additional steps if liquid water is detected at step 530. For example, method 500 can include terminating (e.g., by actuating a valve) a flow of water to water filter 130. As another example, visual or audio signals can be provided to a user of system 100 if liquid water is detected at step 530. Thus, a light emitting device can flash and/or a sound generator can emit sound if liquid water is detected at step 530. In such a manner, the user of system 100 can be alerted if system 100 detects liquid water and/or leaking water.

Figure 6:
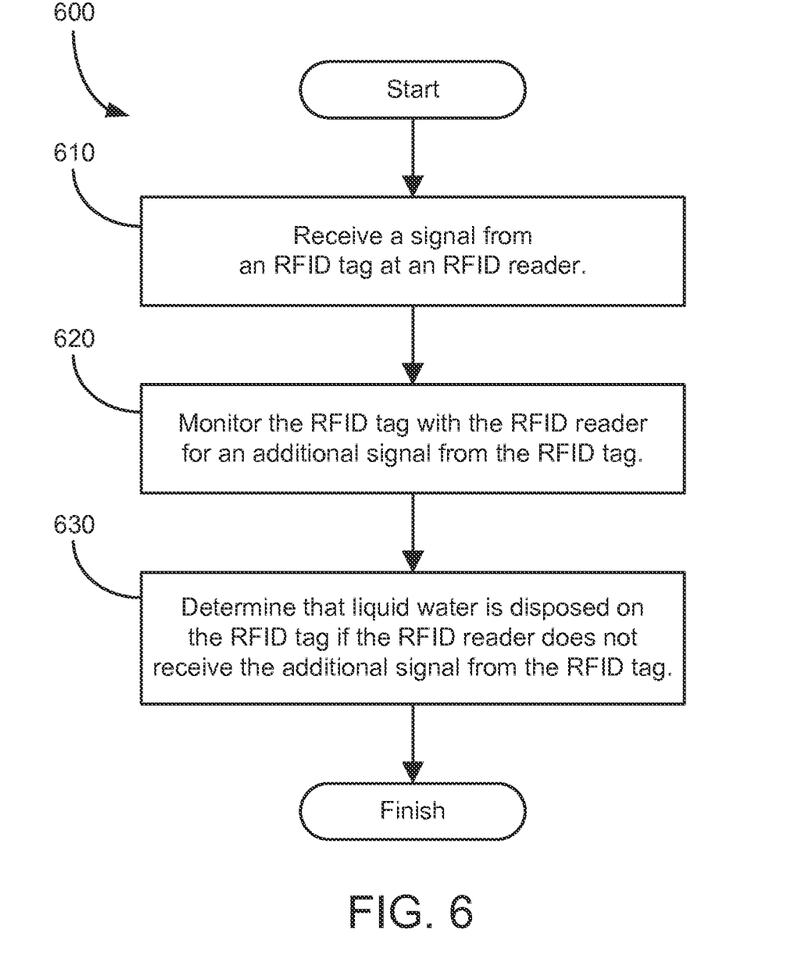
FIG. 6 illustrates a method for detecting liquid water according to another exemplary embodiment of the present subject matter.

FIG. 6 illustrates a method 600 for detecting liquid water according to another exemplary embodiment of the present subject matter. Method 600 can be used to detecting liquid water in any suitable system. For example, method 600 may be used to detecting liquid water in system 100 (FIGS. 1 and 2), system 200 (FIG. 3) and/or system 300 (FIG. 4). In particular, controller 114 of RFID reader 110 may be configured for implementing method 600.

At step 610, RFID reader 110 receives a signal from RFID tag 120. As an example, controller 114 can determine that RFID reader 110 has received the signal from RFID tag 120 at step 610. In particular, controller 114 can activate RFID reader 110 such that RFID reader 110 queries RFID tag 120 by sending a request signal to RFID tag 120. In response to the request signal, RFID tag 120 can generate or transmit a response signal that is received at RFID reader 110. In such a manner, controller 114 can determine that RFID reader 110 has received a signal from RFID tag 120.

At step 620, RFID reader 110 monitors RFID tag 120 for an additional signal from RFID tag 120. For example, controller 114 can monitor RFID tag 120 with RFID reader 110 for the additional signal from RFID tag 120 at step 620. In particular, controller 114 can continuously or intermittently operate RFID reader 110 such that RFID reader 110 queries RFID tag 120 by sending a request signal to RFID tag 120. If RFID tag 120 receives the request signal from RFID reader 110, RFID tag 120 can generate or transmit the additional signal that is received at RFID reader 110 in response to the request signal. If RFID reader 110 receives the additional signal from RFID tag 120, controller 114 can determine that RFID reader 110 and RFID tag 120 are in signal communication C with each other. Conversely, if RFID reader 110 does not receive the additional signal from RFID tag 120, controller 114 can determine that RFID reader 110 and RFID tag 120 are not in signal communication C with each other. In such a manner, controller 114 can monitor RFID tag 120 with RFID reader 110 for an additional signal from RFID tag 120.

At step 630, a presence of liquid water on RFID tag 120 is determined or established, e.g., if the additional signal from RFID tag 120 is not received at RFID reader 110 at or during step 620. As an example, controller 114 can determine that liquid water is disposed or present on RFID tag 120 or between RFID reader 110 and RFID tag 120, e.g., within gap G or on RFID tag 120, at step 630. As discussed above, liquid water between RFID reader 110 and RFID tag 120 can absorb radio waves and disrupt signal communication C between RFID reader 110 and RFID tag 120. Further, the electrical characteristics of antenna 122 of RFID tag 120 can be changed (e.g., the capacitance of water sensitive capacitor 126 or the resistance of water sensitive resistor 124), such that antenna 122 of RFID tag 120 is deactivated or disabled when RFID tag 120 is exposed to liquid water. In such a manner, RFID reader 110 can fail to receive the additional signal from RFID tag 120 and/or RFID tag 120 can fail to transmit the additional signal to RFID reader 110 due to the presence of liquid water between RFID reader 110 and RFID tag 120 or on RFID tag 120.

Method 600 can include various additional steps if liquid water is detected at step 630. For example, method 600 can include terminating (e.g., by actuating a valve) a flow of water to water filter 130. As another example, visual or audio signals can be provided to a user of system 100 if liquid water is detected at step 630. Thus, a light emitting device can flash and/or a sound generator can emit sound if liquid water is detected at step 630. In such a manner, the user of system 100 can be alerted if system 100 detects liquid water and/or leaking water.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A system for detecting liquid water at a water filter, comprising:
   a radio-frequency identification (RFID) tag mounted to the water filter; and
   an RFID reader having a controller, a position of the RFID reader being fixed relative to the RFID tag, the controller of the RFID reader configured for:
      establishing continuous signal communication between the RFID tag and the RFID reader;
      monitoring the continuous signal communication between the RFID tag and the RFID reader; and determining that liquid water is disposed on the RFID tag if the continuous signal communication between the RFID tag and the RFID reader is disrupted during the step of monitoring.

2. The system of claim 1, wherein the RFID tag comprises a passive RFID tag.

3. The system of claim 1, wherein the RFID tag comprises an antenna and a water sensitive resistor, the water sensitive resistor electrically coupled to the antenna of the RFID tag, the water sensitive resistor configured for changing a resistance of the water sensitive resistor when the water sensitive resistor is exposed to liquid water.

4. The system of claim 3, wherein the water sensitive resistor extends between terminals of the antenna of the RFID tag.

5. The system of claim 3, wherein the water sensitive resistor comprises an absorbent medium mounted to the antenna and an electrolyte disposed within the absorbent medium, the electrolyte within the absorbent medium dissolving when the absorbent medium is exposed to liquid water.

6. The system of claim 3, wherein the water sensitive resistor comprises a resistive humistor that extends across coils of the antenna of the RFID tag.

7. The system of claim 1, wherein the RFID tag comprises an antenna and a water sensitive capacitor, the water sensitive capacitor electrically coupled to the antenna of the RFID tag, the water sensitive capacitor configured for changing a capacitance of the water sensitive capacitor when the water sensitive capacitor is exposed to liquid water.

8. The system of claim 7, wherein the water sensitive capacitor extends across coils of the antenna of the RFID tag.

9. The system of claim 7, wherein the wherein the water sensitive capacitor comprises a capacitive humistor.

10. The system of claim 1, wherein the RFID tag comprises an antenna, the antenna of the RFID tag configured for deactivating when the antenna of the RFID tag is exposed to liquid water.

11. The system of claim 1, the continuous signal communication between the RFID tag and the RFID reader comprises receiving a signal from the RFID tag at the RFID reader.

12. A method for detecting liquid water at a water filter, comprising:
fixing a position of a radio-frequency identification (RFID) tag mounted to the water filter relative to an RFID reader;
establishing continuous signal communication between the RFID tag and the RFID reader after said step of fixing;
monitoring the continuous signal communication between the RFID tag and the RFID reader, a position of the RFID tag relative to the RFID reader substantially fixed during said step of monitoring;
determining that liquid water is disposed between the RFID tag and the RFID reader if the continuous signal communication between the RFID tag and the RFID reader is disrupted during the step of monitoring; and
activating an alert if liquid water is disposed between the RFID tag and the RFID reader.

13. The method of claim 12, wherein a gap between the RFID tag and the RFID reader is substantially constant during said step of monitoring.

* * * * *